US012298470B2

(12) United States Patent
Argoitia et al.

(10) Patent No.: US 12,298,470 B2
(45) Date of Patent: May 13, 2025

(54) THIN FILM INTERFERENCE PIGMENTS WITH A COATING OF NANOPARTICLES

(71) Applicant: VIAVI SOLUTIONS INC., San Jose, CA (US)

(72) Inventors: Alberto Argoitia, Santa Rosa, CA (US); John Edward Book, Santa Rosa, CA (US); Jaroslaw Zieba, Santa Rosa, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 122 days.

(21) Appl. No.: 16/808,188

(22) Filed: Mar. 3, 2020

(65) Prior Publication Data

US 2020/0284947 A1 Sep. 10, 2020

Related U.S. Application Data

(60) Provisional application No. 62/966,391, filed on Jan. 27, 2020, provisional application No. 62/813,483, filed on Mar. 4, 2019.

(51) Int. Cl.
*G02B 1/10* (2015.01)
*C09C 1/00* (2006.01)
(Continued)

(52) U.S. Cl.
CPC .............. *G02B 1/10* (2013.01); *C09C 1/0015* (2013.01); *G02B 5/22* (2013.01); *G02B 5/28* (2013.01);
(Continued)

(58) Field of Classification Search
CPC ... G02B 1/10; G02B 5/22; G02B 5/28; G02B 5/206; C09C 1/0015; C09C 2200/306;
(Continued)

(56) References Cited

U.S. PATENT DOCUMENTS 5,814,686 A * 9/1998 Micale .................... C08K 9/10 524/439
6,531,221 B1 * 3/2003 Schuhmacher .......... C09D 5/36 428/407
(Continued)

FOREIGN PATENT DOCUMENTS

BR 102012017356 3/2014
CN 1267686 A 9/2000
(Continued)

OTHER PUBLICATIONS

Yan Yan et al., "Assembly of Layer-by-Layer Particles and Their Interactions with Biological Systems", ACS Publications, Aug. 22, 2013, 9 pages.
(Continued)

*Primary Examiner* — Balram T Parbadia
(74) *Attorney, Agent, or Firm* — Mannava & Kang, P.C.

(57) ABSTRACT

An article including a thin film interference pigment; and a coating including a selectively absorbing nanoparticle is disclosed. The article can exhibit increased chromaticity as compared to the thin film interference pigment alone. A method of making the article is also disclosed. The method comprises providing a thin film interference pigment and coating the thin film interference pigment with a selectively absorbing nanoparticle.

24 Claims, 4 Drawing Sheets

(51) Int. Cl.
*G02B 5/22* (2006.01)
*G02B 5/28* (2006.01)
*B82Y 20/00* (2011.01)

(52) U.S. Cl.
CPC ......... *B82Y 20/00* (2013.01); *C09C 2200/306* (2013.01)

(58) Field of Classification Search
CPC .................. C09C 1/0033; C09C 1/642; C09C 2200/1054; C09C 2220/20; B82Y 20/00; C01P 2006/62; C01P 2006/63; C01P 2006/64; C01P 2006/65; C01P 2006/66; C25D 11/04; C25D 11/14
See application file for complete search history.

(56) References Cited

U.S. PATENT DOCUMENTS 6,596,070 B1 7/2003 Schmidt et al.
6,777,085 B1 * 8/2004 Argoitia ................ C09C 1/0015 428/404
6,784,608 B2 * 8/2004 Araki .................... C03C 17/007 313/479
8,172,934 B2 5/2012 Hashizume
11,472,963 B2 10/2022 Horiguchi
2002/0192448 A1 12/2002 Schoen et al.
2003/0060538 A1 3/2003 Norris et al.
2003/0177949 A1 * 9/2003 Phillips .................... C09D 5/36 428/363
2003/0215641 A1 11/2003 Philips et al.
2004/0124398 A1 7/2004 Kuntz et al.
2005/0019575 A1 1/2005 Jungnitz et al.
2007/0126694 A1 6/2007 Moriyama et al.
2008/0070153 A1 * 3/2008 Ioku ........................ G02B 5/22 430/270.1
2008/0128286 A1 * 6/2008 Wu ........................ B82Y 20/00 205/95
2008/0292820 A1 11/2008 Padiyath et al.
2008/0318012 A1 12/2008 Domnick et al.
2010/0180796 A1 7/2010 Kitamura et al.
2010/0297045 A1 * 11/2010 Kaupp .................. C09C 1/0021 424/59
2011/0197782 A1 * 8/2011 Wang ................... C09D 11/037 106/404
2011/0223218 A1 * 9/2011 Jones ....................... A61Q 1/02 424/401
2011/0237683 A1 * 9/2011 Schmid ................. C09C 1/0081 524/441
2012/0050386 A1 3/2012 Shimizu et al.
2013/0116106 A1 5/2013 Servin et al.
2013/0200415 A1 8/2013 Evans et al.
2013/0221837 A1 8/2013 De Brouwer et al.
2015/0116856 A1 4/2015 Lee et al.
2016/0002432 A1 1/2016 Vo et al.
2016/0061417 A1 3/2016 Kim et al.
2016/0185972 A1 * 6/2016 Schmidt ................ C09C 1/0015 427/213
2017/0328539 A1 11/2017 Huang
2017/0348202 A1 * 12/2017 Grüner ..................... A61Q 3/02
2017/0355855 A1 * 12/2017 Grüner .................. C09C 1/0015
2017/0369709 A1 12/2017 Seydel et al.
2018/0073159 A1 3/2018 Curran et al.
2018/0084658 A1 3/2018 Curran et al.
2018/0239070 A1 8/2018 England et al.
2018/0346346 A1 * 12/2018 Zhu ........................ C25D 11/04
2019/0006541 A1 1/2019 So et al.
2019/0182996 A1 6/2019 Kelkar et al.
2020/0283637 A1 9/2020 Book et al.
2020/0284947 A1 9/2020 Argoitia et al.
2021/0231849 A1 7/2021 Argoitia et al.

FOREIGN PATENT DOCUMENTS

CN 1459034 A 11/2003
CN 1542059 A 11/2004
CN 1756805 4/2006
CN 101120059 2/2008
CN 102504620 A 6/2012
CN 103804963 A 5/2014
CN 104205376 A 12/2014
CN 105682451 A 6/2016
CN 106526962 A 3/2017
CN 108219541 A1 6/2018
CN 110337468 A 10/2019
DE 102008060228 6/2010
EP 0861299 B1 4/2000
EP 1254928 11/2002
EP 2361953 8/2011
ES 2341940 6/2010
JP H04332766 11/1992
JP H07157689 A1 6/1995
JP H08199098 A1 8/1996
JP H0959532 A 3/1997
JP 2001152049 A1 6/2001
JP 2006521463 A 9/2006
JP 2006299051 11/2006
JP 2007518841 A1 4/2007
JP 2009511725 A1 3/2009
JP 2009221140 A1 10/2009
JP 2013518953 A 5/2013
JP 2017149946 A1 8/2017
KR 20180066820 6/2018
RU 2015143539 A 4/2017
WO 2004/050350 6/2004
WO 2007094253 A1 8/2007
WO 2015/052319 4/2015
WO 2017/041085 3/2017
WO 2018199182 A1 11/2018

OTHER PUBLICATIONS

R.K. Iler "Multilayers of Colloidal Particles", Journal of Colloid and Interface Science 21, year 1966, pp. 569-594.

Marc Michel et al., "Review article: Deposition Mechanisms in Layer-by-Layer or Step-by-Step Deposition Methods: From Elastic and Impermeable Films to Soft Membranes with Ion Exchange Properties", ISRN Materials Science, vol. 2012, Article ID 701695, 13 pages.

Science Direct Topics, "Perylene—an overview", Downloaded from the Internet on Nov. 29, 2023, 18 pages. (https://www.sciencedirect.com/topics/chemistry/perylene#:~:text=Perylene%201%20is%20a%20polycyclic,high%2Dboiling%20mineral%20oil%20fractions.).

Wikipedia, "Perinone", downloaded from the Internet on Nov. 29, 2023, 2 pages.(https://en.wikipedia.org/wiki/Perinone).

Wikipedia, "Quinacridone", downloaded from the Internet on Nov. 29, 2023, 4 pages.(https://en.wikipedia.org/wiki/Quinacridone).

* cited by examiner

THIN FILM INTERFERENCE PIGMENTS WITH A COATING OF NANOPARTICLES

RELATED APPLICATIONS

This application claims the benefit of priority to U.S. Provisional Application No. 62/966,391, filed Jan. 27, 2020, and U.S. Provisional Application No. 62/813,483, filed Mar. 4, 2019, the entire disclosure of both applications is hereby incorporated by reference in their entirety.

FIELD OF THE INVENTION

The present disclosure generally relates to an article including a thin film interference pigment; and a coating including a selectively absorbing nanoparticle. The article can exhibit increased chromaticity as compared to the thin film interference pigment alone. Methods of making the article are also disclosed.

BACKGROUND OF THE INVENTION

Fabry-Perot multilayer structures exhibit a color primarily because of the thickness of a dielectric layer present in the structure. The thickness of the dielectric layer therefore limits the pallet of colors that can be produced.

One way to manipulate the color produced can be to add a colorant into an ink or paint vehicle that includes the Fabry-Perot multilayer structure. However, a blend of a colorant and a Fabry-Perot multilayer structure can be difficult to formulate to obtain the desired final color due to variables with the colorant, such as colorant concentration, colorant size, colorant distribution. Additionally, a blend of a colorant and a Fabry-Perot multilayer structure can be difficult to reproduce batch-to-batch.

Another problem with a blend is the issue of light scattering. In particular, a large quantity of colorant particles distributed in a large volume to create the ink or paint will significantly increase light scattering so that the scattering effects are interdependent. Additionally, colorant absorbing pigments typically used in blends have large particle sizes, which can also increase light scattering because each large particle can independently scatter light.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

Figure 1:
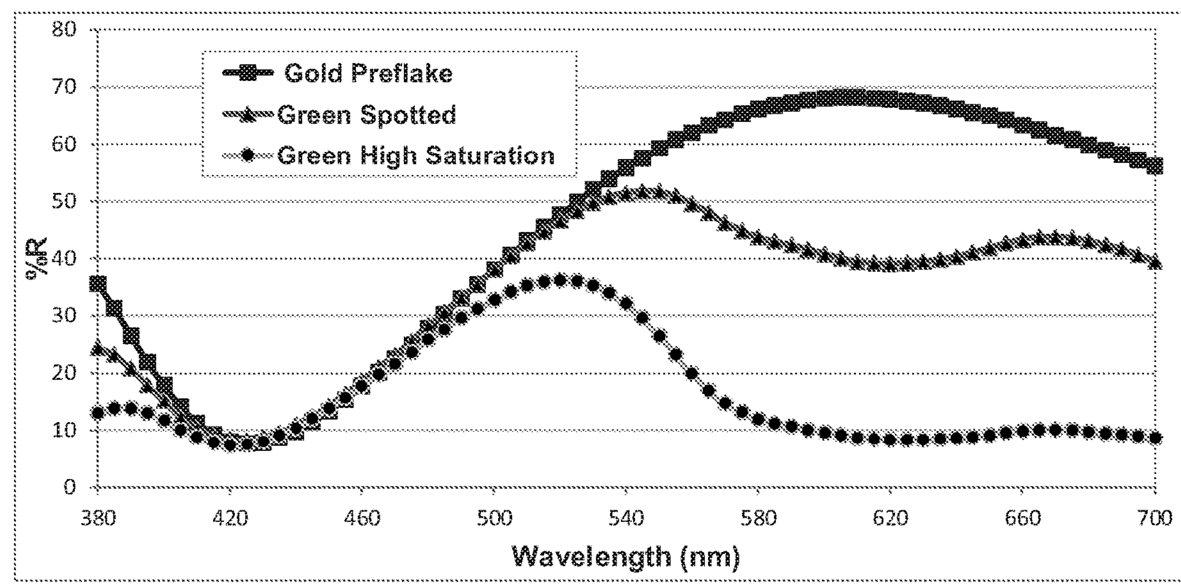
FIG. 1 illustrates the percent reflectance of the Gold Pigment (pre-flake) alone, Sample C (green spotted), and Sample A (green high saturation)

In an aspect, there is disclosed an article including a thin film interference pigment; and a coating including a selectively absorbing nanoparticle on the thin film interference pigment.

In another aspect, there is disclosed a method of making an article including providing a thin film interference pigment; and coating the thin film interference pigment with a selectively absorbing nanoparticle.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are articles; and a method of making and using articles.

The present disclosure describes articles including a pigment, such as thin film interference pigment, coated with a selectively absorbing nanoparticle that can manipulate the reflectance of the pigment to improve chromaticity and/or create a color (at both normal and angle) not possible with the pigment alone. The method of making the disclosed articles is cost effective and can provide a high throughput of higher performance special effect pigments, such as high chroma pigments.

In an aspect, the pigment can include a core material chosen from reflective opaque materials, semi-transparent materials, and transparent materials depending upon the desired optical property of the resultant pigment.

The pigment can be a metal, non-metal, or metal alloy. In one example, the materials for the pigment can include any materials that have reflective characteristics in the desired spectral range. For example, any material with a reflectance ranging from 5% to 100% in the desired spectral range. An example of a reflective material can be aluminum, which has good reflectance characteristics, is inexpensive, and is easy to form into or deposit as a thin layer. Non-limiting examples of reflective opaque material for use in the pigment include aluminum, copper, silver, gold, platinum, palladium, nickel, cobalt, niobium, chromium, tin, iron, and combinations or alloys of these or other metals can be used as the pigment. In an aspect, the material for the pigment can be a white or light colored metal. In other examples, the pigment can include, but is not limited to, the transition and lanthanide metals and combinations thereof; as well as metal carbides, metal oxides, metal nitrides, metal sulfides, a combination thereof, or mixtures of metals and one or more of these materials. In an aspect, the pigment may include a transparent or semi-transparent material chosen from glass, silica, titania, alumina, natural mica, synthetic mica, and bismuth oxychloride. In another aspect, the pigment can include a metalloid material chosen from silicon, germanium, and molybdenum.

In another aspect, the pigment, such as a thin film interference pigment, can be any special effect pigment, such as a pigment including a reflector layer, a dielectric layer, and an absorber layer, and optionally a magnetic layer. Non-limiting examples of commercially available pigments include SPECTRAFLAIR®, CHROMAFLAIR®, OVP, SecureShift, and OVMP available from Viavi Solutions, Inc. (San Jose, CA).

The pigment, such as a thin film interference pigment, can be coated with a selectively absorbing nanoparticle. The nanoparticles can selectively absorb any undesired high or low angle colors from a reflectance spectrum of the pigment, such as the thin film interference pigment. The undesired colors can be located along a color travel path of the thin film interference pigment and can be located between different desired colors. Additionally, the nanoparticles can modify a desired color of the article at different viewing angles. Finally, the nanoparticles can change a color shift of the pigment, such as a thin film interference pigment, so that the color shift of the article is from a low to high wavelength.

The selectively absorbing nanoparticles can be colored and/or can act as a color filter. The selectively absorbing nanoparticles can be nanoparticle chosen from a pigment, a dye, a metallic nanoparticle, a metal oxide, a metal carbide, a metal sulfide, a metal nitride, and combinations thereof. Non-limiting examples of selectively absorbing nanoparticles include titanium dioxide, zinc oxide, silicon dioxide, aluminum oxide, iron (II, III) oxide, zirconium dioxide, indium tin oxide, $CeO_2$, zinc nitride, gold, silver, carbon black, iron oxide, mixed metal oxides, zinc sulfide, iron sulfide, copper sulfide, perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof. In an aspect, the selectively absorbing nanoparticle can be charged.

In particular, the coating can include the selectively absorbing nanoparticles in a suitable matrix. The coating can include a plurality of selectively absorbing nanoparticles in which a portion of the selectively absorbing nanoparticles can be colored. Another portion of the selectively absorbing nanoparticles can be uncolored. In an aspect, the coating can include a plurality of selectively absorbing nanoparticles in which all of the selectively absorbing nanoparticles are a same color. In another aspect, the coating can include a plurality of selectively absorbing nanoparticles of different colors.

The selectively absorbing nanoparticles present in the coating can be the same or different, such as in terms of the material for the nanoparticle, the average particle of the nanoparticles, the concentration (percent volume) of nanoparticles in the coating, etc. In an aspect, the coating includes a plurality of selectively absorbing nanoparticles that are different one from another. A skilled person can adjust the above-described variables to achieve an article with the desired resultant color, including the desired lightness and chroma. For example, a skilled person can select a weakly colored nanoparticle, but with a large average particle size, in a high concentration in the coating to achieve a resultant color in the article with high chroma. Additionally, and or alternatively, a skilled person can select a highly colored nanoparticle, but with a small average particle size, in a medium concentration in the coating to still achieve a resultant color in the article with high chroma.

The selectively absorbing nanoparticles can have an average particle size ranging from less than about 300 nm; for example, from about 2 nm to about 100 nm; for example, from about 4 nm to about 95 nm; and as a further example, from about 6 nm to about 90 nm. The average particle size can have an effect on the resultant chroma of the article. For example, a large average particle size can increase the intensity and/or chroma of the resultant color of the article because the article will achieve color saturation faster, i.e., with less material.

The concentration of the selectively absorbing nanoparticles can also affect the intensity and/or chroma of the resultant color of the article. The selectively absorbing nanoparticles can be present in the coating in an amount greater than about 40% by volume, for example greater than about 65% by volume, and as a further example greater than about 70% by volume. For example, a coating with greater than about 70% by volume of selectively absorbing nanoparticles will have a higher color saturation as compared to a coating with about 65% by volume of selectively absorbing nanoparticles. As a further example, an intensity of the color of the article is increased by a high concentration of the selectively absorbing nanoparticle in the coating.

The coating of selectively absorbing nanoparticles can be a single layer or multiple layers. In an aspect, the disclosed article can include a thin film interference pigment with a coating with multiple layers of selectively absorbing nanoparticles, in which each layer of the multiple layers includes a plurality of selectively absorbing nanoparticles that are different one from another. The use of multiple layers can also increase the color saturation of the article.

The coating of selectively absorbing nanoparticles can be continuous or discontinuous on a surface of the pigment, such as a thin film interference pigment. In an aspect, the coating is continuous on the surface of the pigment. In another aspect, the coating is discontinuous on the surface and has a low impact on light scattering. The coating of selectively absorbing nanoparticles can be present on greater than about 90% of a surface of the pigment; for example, greater than about 95% of the pigment; and as a further example, can be present on all surfaces (100% continuous/encapsulating) the pigment. In an aspect, the coating of selectively absorbing nanoparticles can be discontinuous, such as in the form of spots, lines, etc. An intensity of a color of the article can be increased by a fully encapsulating coating.

In an aspect, the coating can, but should not, negatively impact a hiding property of the thin film interference pigment.

The selectively absorbing nanoparticles can have other properties besides, or in addition to, ultraviolet (UV) light absorption. In an aspect, the selectively absorbing nanoparticles can have a property chosen from fluorescence, phosphorescence, thermochromic, photochromic, and infrared (IR) fluorescence (anti-stokes).

UV light exposure can degrade nanoparticles. In an aspect, the coating can include other particles that can protect the nanoparticles, for example, particles that absorb ultraviolet light and/or decrease photocatalytic activity inherent in some nanoparticles. The coating can include other particles, such as titanium dioxide, zinc oxide, silicon dioxide, $Al_2O_3$, and $CeO_2$.

The nanoparticles can also exhibit metallic resonance plasmons effects. These effects can be enhanced by local fields so that the nanoparticles can have different spectral responses depending upon the light source, e.g., polarized or unpolarized light.

In an aspect, instead of a thin film interference pigment, the article can include a thin film interference foil; and a coating of selectively absorbing nanoparticles on the thin film interference foil. The article can be used as a thread in security applications. The article can include a substrate (PET) and can have the following structure: PET/absorber/dielectric/reflector/coating of selectively absorbing nanoparticle. In another aspect, the article can have the following structure: PET/reflector/dielectric/absorber/coating of selectively absorbing nanoparticle.

A method of making the disclosed article can be performed using techniques, such as layer-by-layer technology. In an aspect, the method can include providing a post-processed thin film interference pigment. In another aspect, the method can include making a thin film interference pigment and coating with selectively absorbing nanoparticles.

A method of making the article disclosed herein can include providing a pigment, such as a thin film interference pigment; and coating the thin film interference pigment with a selectively absorbing nanoparticle. The coating step can include providing a layer of a first charged nanoparticle to the pigment; rinsing; providing a layer of a second charged nanoparticle to the layer of the first charged nanoparticle, wherein the second charged nanoparticle material is oppositely charged from the first charged nanoparticle material; and rinsing; wherein a coating of selectively absorbing nanoparticles is formed on a surface of the pigment. The steps of providing the layer of the first charged nanoparticle and providing the layer of the second charged nanoparticle can be repeated so that the coating of selectively absorbing nanoparticles is a multilayer coating.

The coating step can also include providing a layer of a first charged polymer to the pigment; rinsing; providing a layer of a first charged nanoparticle to the layer of the first charged polymer, wherein the first charged nanoparticle material is oppositely charged from the first charged polymeric material; and rinsing; wherein a coating of selectively absorbing nanoparticles is formed. The steps of providing the layer of the first charged polymer and providing the layer of the first charged nanoparticle can be repeated so that the coating of selectively absorbing nanoparticles is a multilayer coating.

The coating step can also include providing a final step with a charged polymer to the last coating including charged selectively absorbing nanoparticle of the multilayer to provide for specific surface functionalization of the pigments.

The coating of selectively absorbing nanoparticles can fully encapsulate the pigment, such as the thin film interference pigment. The coating is continuous on all surfaces of the pigment. Alternatively, the coating of selectively absorbing nanoparticles can encapsulate a portion of the pigment, such as the thin film interference pigment. The coating can be continuous, and yet only encapsulate a portion of the pigment. The coating can be discontinuous and encapsulate a portion of the pigment.

In an alternative method, the multilayer coating can be created by alternating a layer of selectively absorbing nanoparticles and a layer of charged polymers (polyelectrolytes) or other molecules presenting interacting binding sites. So, a layer sequence comprises one or more materials having ionic groups of opposite charges. A simple layer sequence can be ABAB(AB)n, wherein n is an integer greater than 1. Notice that even shown as different materials A and B, these two materials could be the same material where the surface was rendered of opposite charges. The multilayer coating could also use more materials. The multilayer coating can include any materials and is only dependent upon the selection of the charges for each material.

The steps of providing a layer of first charged or second charged nanoparticles can use any technologies, such as filtration, sedimentation or centrifugation processes. In these processes, the nanoparticles are allowed to sediment or are filtered or centrifuged (faster processes) after the successive application of the first charged nanoparticle (A), rinsing stage, and resuspension/application of the second charged nanoparticle (B). Other process may include successive filtration using systems such as filter reactors, trickle-bed reactors, up-flow reactors, membrane reactors, and the equivalent. In another method, the pigment could be forced to transit (i.e. by sprayed) to areas containing atomized solutions of first charged nanoparticle (A), rinsing media, and second charged nanoparticle (B). Alternative deposition techniques include wet coating method including dip coating, spin coating, flow coating, spray coating, roll coating, gravure coating, and a similar method.

The steps of rinsing can be performed with any solvent, such as a polar solvent. Non-limiting examples of solvents can include water; acetates, such as ethyl acetate, propyl acetate, and butyl acetate; acetone; ketones, such as dimethyl ketone (DMK), methylethyl ketone (MEK), secbutyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof.

The method can further include a step of providing a layer to a surface of the pigment prior to providing a coating of nanoparticles. The layer is located between the thin film interference pigment and the coating to protect the thin film interference pigment or to provide a receptive surface for the coating. In an aspect of the invention, the distribution of the receptive layer on the surface of the pigment can allow for controlling the distribution of the coating including the selectively absorbing nanoparticles. In particular, the layer can inhibit oxidation of the pigment when it is exposed to the coating of selectively absorbing nanoparticles. The layer can include a sol-gel layer of materials such as silica, titania, alumina, zirconia, ceria, or combinations to mention few or a polymeric layer, for example. In an aspect, the method of making an article can include providing a pigment; providing a layer of a first charged nanoparticle to the pigment; rinsing; providing a layer of charged polymer (polyelectrolytes) or other molecules presenting interacting binding sites; rinsing; providing a layer of a second charged nanoparticle to the layer of the charged polymer (polyelectrolytes) or other molecules presenting interacting binding sites; and rinsing.

The method can further include a step of providing a second protecting layer to a top-most layer of the coating of nanoparticles. The second protecting layer can include a layer of charged polymers (polyelectrolytes) or other organic molecules presenting interacting binding sites or a sol-gel layer. In an aspect, a second protecting layer of charged polymers (polyelectrolytes) or other organic molecules presenting interacting binding sites can provide a functionalized outer surface with tunable properties such as hydrophilicity, hydrophobicity, lipophilicity, permeability, hardness, stiffness, to mention a few to the pigment.

In an additional aspect, the method can further include encapsulating the selectively absorbing nanoparticles, which are coated on the pigment, with a protectant layer.

The method can include making a thin film interference pigment on a substrate with a release layer. The release layer can be compatible with liquid coating processes and vacuum deposition.

The method can include several post-processing steps, such as stripping the article from the release layer/substrate, grinding, etc.

EXAMPLES

Example 1

A gold thin film interference pigment was encapsulated to varying degrees to produce different levels of intensity depending on the saturation/intensity by the coated selectively absorbing nanoparticle. The pigment was based on the following structure: Cr/ZnS/Al/ZnS/Cr. In sample A) a gold thin film interference pigment was fully encapsulated with a continuous coating of selectively absorbing nanoparticles, i.e. a cyan pigment, in a high concentration. In sample B) the same gold thin film interference pigment was fully encapsulated with a continuous coating of selectively absorbing nanoparticles, i.e. the same cyan pigment, but with a lower concentration of the selectively absorbing nanoparticles in the coating, e.g. 65% by volume. In sample C) the same gold thin film interference pigment was partially encapsulated with a discontinuous coating of selectively absorbing nanoparticles, i.e. the same cyan pigment, but with a larger average particle size as compared to samples A and B. All three samples A, B, and C will exhibit a green color, but with varying degrees of intensity and chroma. Sample A has a higher intensity/color saturation as compared to Samples B and C. Samples B and C had a less saturated color, i.e., it is more pastel, because reflected light comes from areas of the pigment that are not filtered by the coating. An intensity of a color of the article was increased by a high concentration of the selectively absorbing nanoparticle in the coating. Additionally, an intensity of a color of the article was increased by a fully encapsulating coating.

The optical characterization of the three Samples was done using paint draw downs on Leneta cards and analyzed under diffuse illumination with a DC650 Photospectrometer. Table 1 shows the Lightness (L*), a*, b*, chroma and hue of the Samples. As can be seen, the lightness (L*) decreased and the hue increased as the coating of the selectively absorbing nanoparticles was increased.

TABLE 1

Optical Properties measured with DC650 Photospectrometer.

| Sample Name | Gold Pigment Alone | Sample C | Sample A |
|---|---|---|---|
| L* | 78.98 | 71.82 | 54.25 |
| a* | 0.19 | −15.99 | −42.84 |
| b* | 54.56 | 40.65 | 13.20 |
| c* | 54.56 | 43.68 | 44.82 |
| h | 89.8 | 111.48 | 162.88 |

Figure 2:
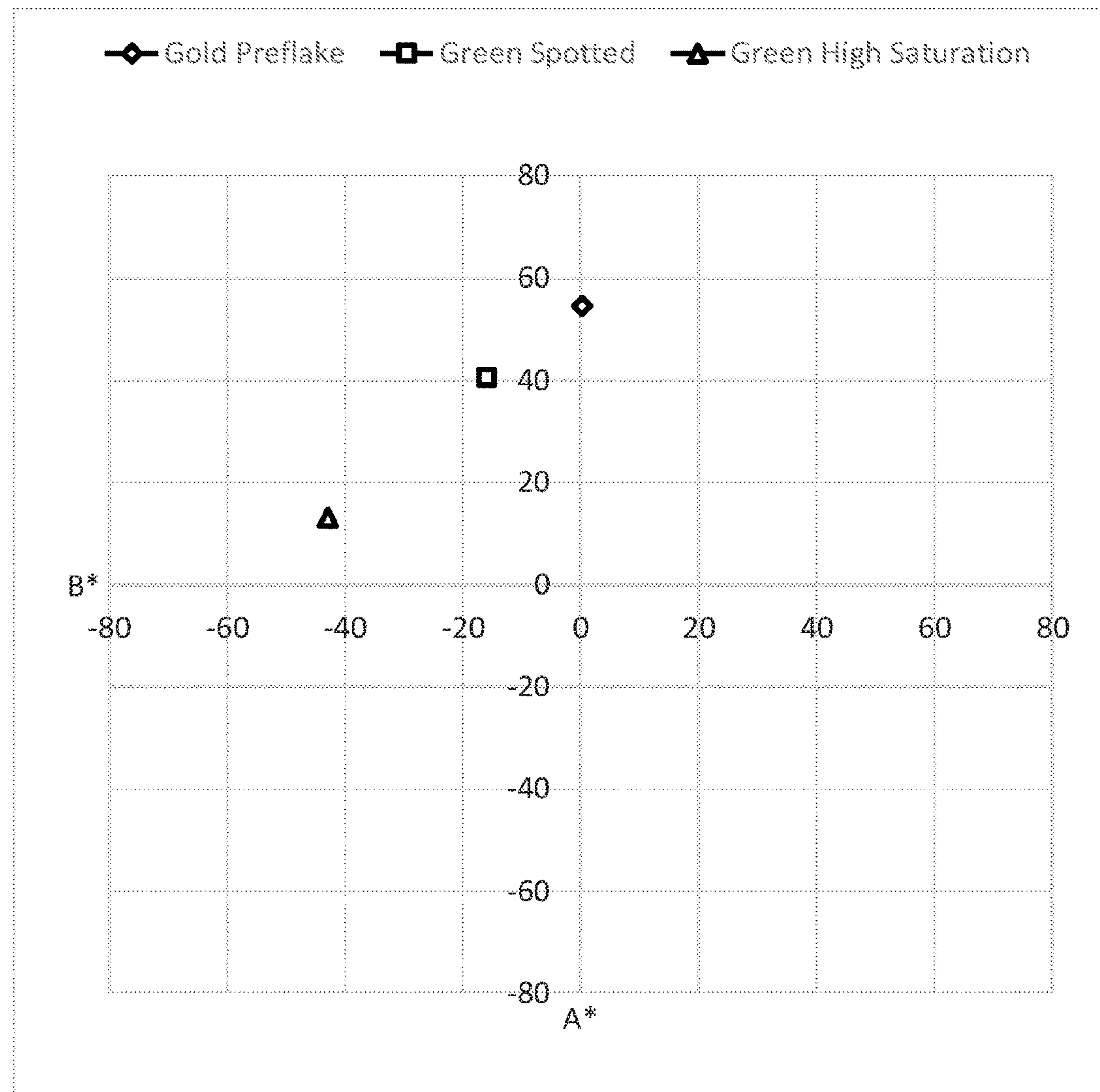
FIG. 2 illustrates the hue of the samples in FIG. 1 using an a*, b* graph.

FIG. 1 illustrates the percent reflectance of the Gold Pigment (pre-flake) alone, Sample C (green spotted), and Sample A (green high saturation). FIG. 2 illustrates the hue of the samples in FIG. 1 using an a*, b* graph. Looking at FIGS. 1 and 2, one can see the evolution of the color as the concentration and/or encapsulation of the coating of the selectively absorbing nanoparticles (cyan pigment) increases. As reported in Table 1 and shown in FIG. 2, Sample A is green with a higher hue value of 162.88, followed by Sample C, which visually looks like a yellow-green color with a hue of 111.48, and the gold pigment (pre-flake) alone is a gold color with a hue of 89.8 (does not include a coating of selectively absorbing nanoparticles, e.g., cyan pigment).

Example 2

The colors at normal and high angle (60°) of commercially available pigments with a coating of selectively absorbing nanoparticles (cyan, magenta, yellow, and green) were used to determine the expected dominant spectral color. However, depending upon variables, such as those discussed herein including intensity, absorbing power, and concentration of nanoparticles, the color shift trajectory of the coated thin film interference pigment can change. Additionally, optical properties of a selectively absorbing nanoparticle can have small spectral changes that modify a visual color observed. For example, a number of cyan pigments show band tails in the visible region that produce a yellow component to color. For this reason, the spectral absorption of the selectively absorbing nanoparticles can be used to better predict the final color travel of the article (thin film interference pigment coated with selectively absorbing nanoparticle).

Figure 3:
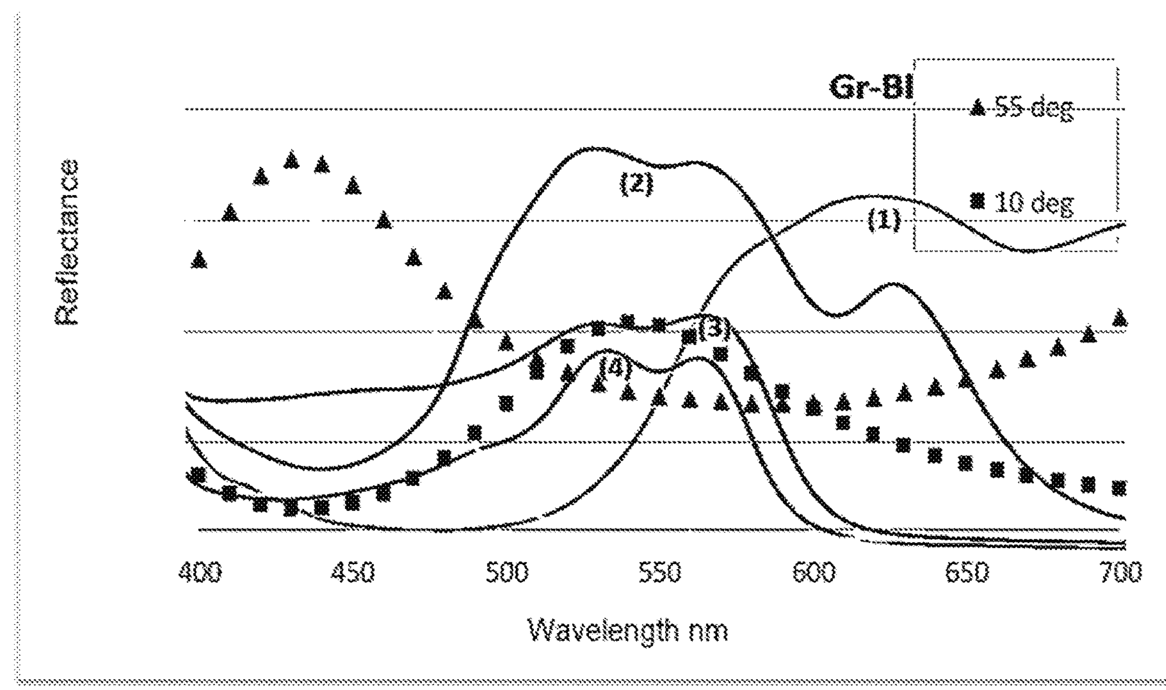
FIG. 3 is a reflectance plot for a thin film interference pigment a low and high angle.
Figure 4:
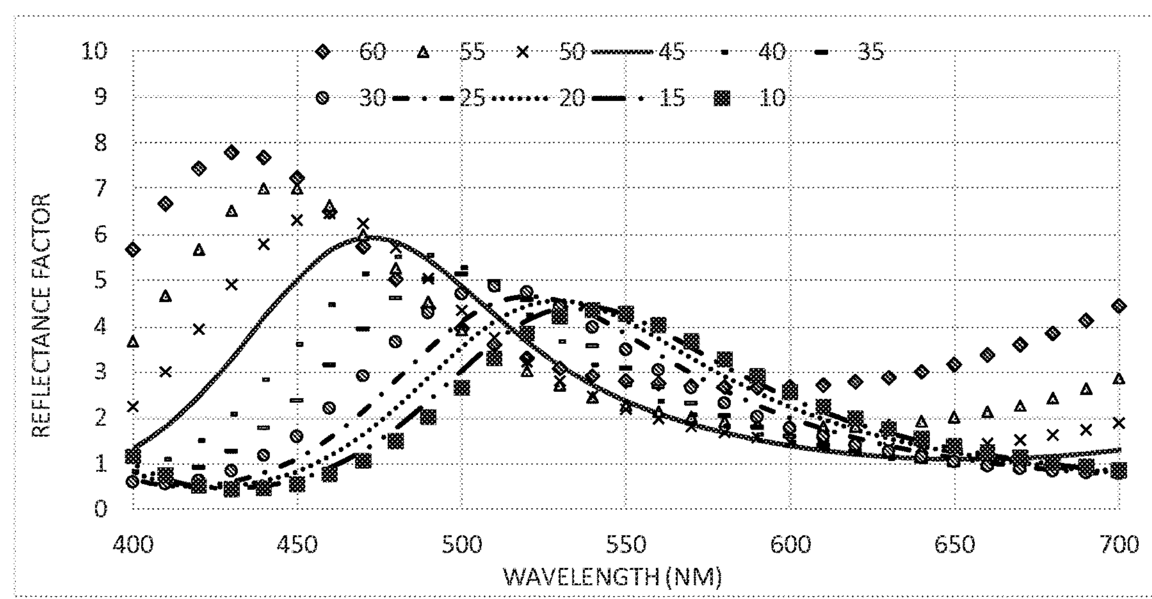
FIG. 4 is a reflectance plot for a thin film interference pigment for various angles from low to high angle.

The new color travel as a function of the illumination and viewing angles can be predicted based on the reflectance versus wavelength plots of the thin film interference pigment and on the wavelength and intensity absorbed by the coating of the selectively absorbing nanoparticle. FIG. 3 is graph illustrating the reflectance plots of a thin film interference pigment at low (10 degrees) and high angle (55 degrees) showing a color travel from green to blue. A coating of selectively absorbing nanoparticles (yellow pigment, which is a blue light absorber) was applied. FIG. 3 also illustrates the absorption of several other selectively absorbing nanoparticles (1) cyan: (2) magenta; (3) red 1; and (4) red 1. FIG. 4 illustrates the reflectance curves for the thin film interference pigment when viewed at normal to high angle. The coating of the selectively absorbing nanoparticle (yellow pigment) blocked the reflectance for angles higher than 45 degrees. It was also determined that the design of the thin film interference pigment can be changed to change a peak position of color at different angles so that the angles at which some reflected peaks will be blocked.

Example 3

Color travel from special effect pigments based on thin film interference is from high to low wavelength as the viewing angle changes from normal (low) to high. Table 2 below shows four (4) selectively absorbing nanoparticles and the wavelength color that each color absorbs. Table 2 also shows two thin film interference pigments and the wavelength color at normal (low) and high. Table 2 also shows the predicted reflected color of an article including the thin film interference pigment and a coating with selectively absorbing nanoparticles.

TABLE 2

| | | Selectively Absorbing Nanoparticle | | | |
|---|---|---|---|---|---|
| | | Cyan | Magenta | Yellow | Green (discontinuous) |
| | | Absorbs | | | |
| | | Red | Green | Blue | Magenta (Blue and Red) |
| Green to | Green | Green | Black | Green | Dark Green |
| Purple | Purple | Blue | Magenta | Red | Black |
| Magenta | Magenta | Blue | Magenta | Red | Black |
| to Green | Green | Green | Black | Red | Green |

Figure 5:
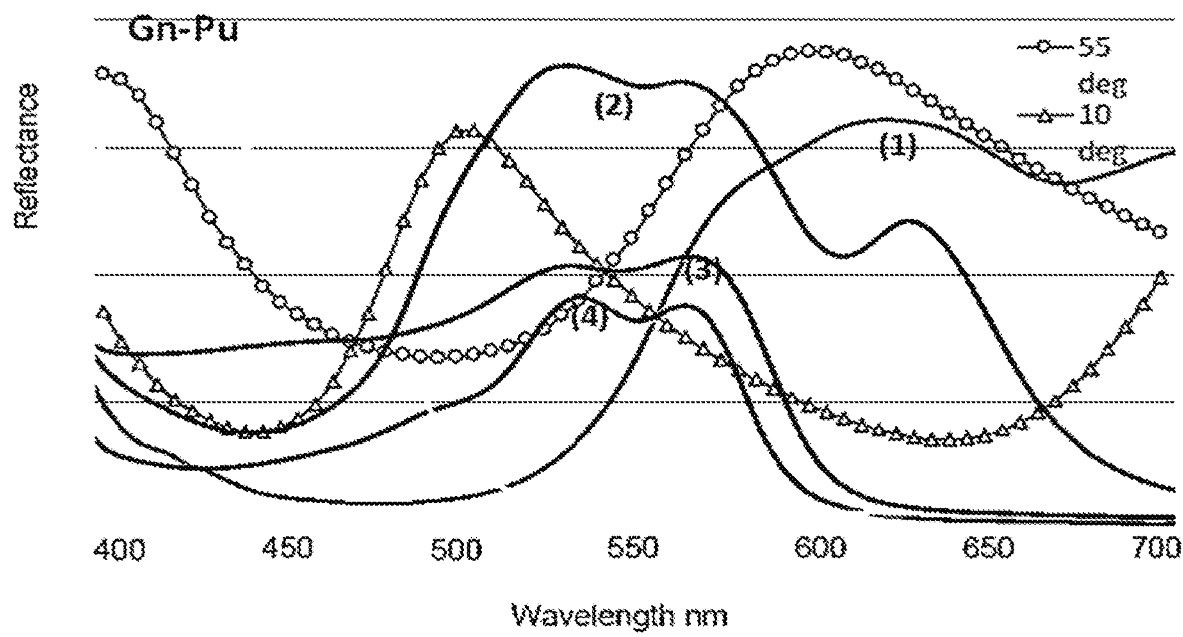
FIG. 5 illustrates a thin film interference pigment with a color travel from green to purple.

FIG. 5 illustrates the color travel of the thin film interference pigment that color shifted from green to purple. Because there are two reflectance peaks at high angle, it could be possible to select the appropriate single selectively absorbing nanoparticle, such as a yellow pigment, or the appropriate blend of nanoparticles, in order to force the color travel in a reverse direction, such as from green to red. FIG. 5 also illustrates the absorption of several other selectively absorbing nanoparticles (1) cyan: (2) magenta; (3) red 1; and (4) red 1.

Figure 6:
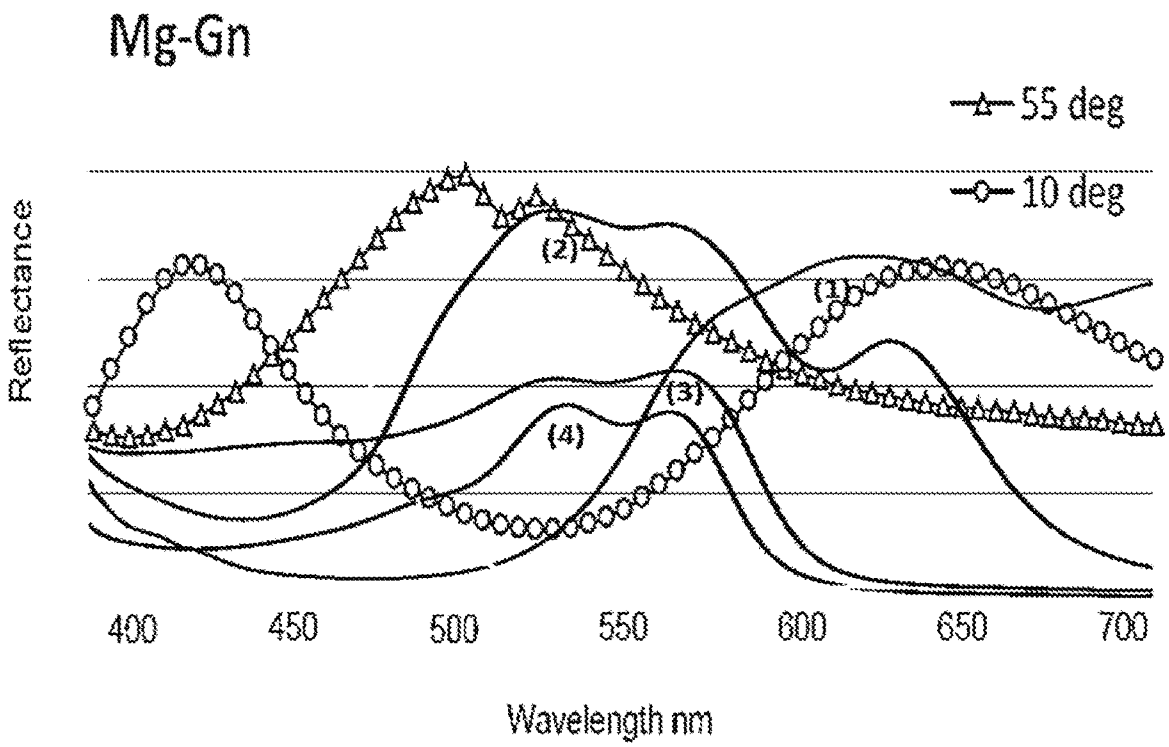
FIG. 6 illustrates a thin film interference pigment with a color travel from magenta to green.

FIG. 6 illustrates the color travel of the thin film interference pigment that color shifted from magenta to green, which is basically the reverse of the pigment illustrated in FIG. 5. So, now there are two reflectance peaks at normal. It could be possible to select the appropriate selectively absorbing nanoparticle, such as a cyan pigment, or the appropriate blend of nanoparticles in order to force the color travel in a reverse direction, such as from magenta (blue) to red.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the coatings, devices, activities and mechanical actions disclosed herein. For each coating, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a coating can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An article, comprising:

a thin film interference pigment comprising a reflective material chosen from a metal or metal alloy, a dielectric layer, and an absorber layer; and a coating including a selectively absorbing nanoparticle on the thin film interference pigment, wherein the coating including the selectively absorbing nanoparticle is discontinuous;

wherein the article is a coated thin film interference pigment;

wherein the selectively absorbing nanoparticle is not a metallic nanoparticle; and wherein the selectively absorbing nanoparticle is a nanoparticle chosen from a dye, a nanoparticle consisting of a metal oxide, a metal carbide, a nanoparticle consisting of a metal sulfide, and combinations thereof.

2. The article of claim 1, wherein the selectively absorbing nanoparticle is colored.

3. The article of claim 1, wherein the coating includes a plurality of selectively absorbing nanoparticles in which a portion of the selectively absorbing nanoparticles are colored.

4. The article of claim 1, wherein the coating includes a plurality of selectively absorbing nanoparticles in which all of the selectively absorbing nanoparticles are a same color.

5. The article of claim 1, wherein the coating includes a plurality of selectively absorbing nanoparticles of different colors.

6. The article of claim 1, wherein the coating includes a plurality of selectively absorbing nanoparticles that are different one from another.

7. The article of claim 1, wherein the selectively absorbing nanoparticle is a nanoparticle chosen from a metal carbide, a nanoparticle consisting of a metal sulfide, and combinations thereof.

8. The article of claim 1, wherein the thin film interference pigment includes a magnetic layer.

9. The article of claim 1, wherein the coating including the selectively absorbing nanoparticle includes at least one nanoparticle chosen from a titanium dioxide nanoparticle, zinc oxide nanoparticle, silicon dioxide nanoparticle, $Al_2O_3$ nanoparticle, and $CeO_2$ nanoparticle.

10. A method of making an article, comprising:

providing a thin film interference pigment comprising a reflective material chosen from a metal or metal alloy, a dielectric layer, and an absorber layer; and coating the thin film interference pigment with a coating including a selectively absorbing nanoparticle, wherein the coating including the selectively absorbing nanoparticle is discontinuous;

wherein the article is a coated thin film interference pigment;

wherein the selectively absorbing nanoparticle is not a metallic nanoparticle; and wherein the selectively absorbing nanoparticle is a nanoparticle chosen from a dye, a nanoparticle consisting of a metal oxide, a metal carbide, a nanoparticle consisting of a metal sulfide, and combinations thereof.

11. The method of claim 10, wherein the coating including the selectively absorbing nanoparticle encapsulates a portion of the thin film interference pigment.

12. The method of claim 10, wherein an intensity of a color of the article is increased by a high concentration of the selectively absorbing nanoparticle in the coating.

13. The method of claim 10, wherein an intensity of a color of the article is increased by a fully encapsulating second coating.

14. The method of claim 10, wherein an intensity of a color of the article is increased by an increased average particle size of the selectively absorbing nanoparticle.

15. The method of claim 10, providing a layer between the thin film interference pigment and the coating to protect the thin film interference pigment.

16. The method of claim 10, providing a layer between the thin film interference pigment and the coating to provide a receptive surface for the coating.

17. The method of claim 10, wherein the thin film interference pigment exhibits a color travel from a high wavelength of light to a low wavelength of light; and wherein the article exhibits a color travel from a low wavelength of light to a high wavelength of light.

18. The method of claim 10, wherein the article exhibits a decrease in lightness and an increase in hue as compared to the thin film interference pigment.

19. The method of claim 10, further comprising encapsulating the selectively absorbing nanoparticles with a protectant layer.

20. The method of claim 19, wherein the protecting layer includes a layer of charged polymers, a layer of organic molecules, or a sol-gel layer.

21. The method of claim 10, wherein the coating step includes providing a layer of a first charged polymer to the thin film interference pigment;

rinsing;

providing a layer of a first charged nanoparticle to the first charged polymer, wherein the first charged nanoparticle material is oppositely charged from the first charged polymer material.

22. The method of claim 10, further comprising providing a layer to a surface of the thin film interference pigment to inhibit oxidation of the pigment when the thin film interference pigment is exposed to the coating.

23. The method of claim 22, wherein the layer includes silica, titania, alumina, zirconia, ceria, a polymeric layer, or combinations thereof.

24. An article, comprising:

a thin film interference pigment comprising a reflective material chosen from a metal or metal alloy, a dielectric layer, and an absorber layer; and a coating including a selectively absorbing nanoparticle on the thin film interference pigment, wherein the coating including the selectively absorbing nanoparticle is discontinuous;

wherein the article is a coated thin film interference pigment; and wherein the selectively absorbing nanoparticle is a particle chosen from nanoparticles of iron (II, III) oxide, $CeO_2$ zinc nitride, carbon black, iron oxide, iron sulfide, copper sulfide, perylene, perinone, quinacridone, quinacridonequinone, anthrapyrimidine, anthraquinone, anthanthrone, benzimidazolone, disazo condensation, azo, quinolones, xanthene, azomethine, quinophthalone, indanthrone, phthalocyanine, triarylcarbonium, dioxazine, aminoanthraquinone, isoindoline, diketopyrrolopyrrole, thioindigo, thiazineindigo, isoindoline, isoindolinone, pyranthrone, isoviolanthrone, miyoshi methane, triarylmethane, and mixtures thereof.

* * * * *